(12) United States Patent
Matsumoto

(10) Patent No.: US 8,013,856 B2
(45) Date of Patent: Sep. 6, 2011

(54) IMAGE PROCESSING METHOD

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 1013 days.

(21) Appl. No.: 11/862,271

(22) Filed: Sep. 27, 2007

(65) Prior Publication Data

US 2008/0075346 A1      Mar. 27, 2008

(30) Foreign Application Priority Data

Sep. 27, 2006   (JP) .................................. 2006-262892

(51) Int. Cl.
 *G06T 17/00* (2006.01)

(52) U.S. Cl. ....................................................... 345/424

(58) Field of Classification Search ................... 345/424
See application file for complete search history.

(56) References Cited

U.S. PATENT DOCUMENTS

| | | | |
|---|---|---|---|
| 5,542,032 A * | 7/1996 | Pritt ............................. | 345/421 |
| 6,654,012 B1 | 11/2003 | Luer et al. | |
| 6,862,025 B2 * | 3/2005 | Buehler ........................ | 345/424 |
| 7,133,041 B2 * | 11/2006 | Kaufman et al. ............. | 345/424 |
| 7,515,152 B2 * | 4/2009 | Fossum et al. ............... | 345/427 |
| 2006/0221074 A1 * | 10/2006 | Matsumoto ................... | 345/424 |

OTHER PUBLICATIONS

Sarang Lakare and Arie Kaufman; "Light Weight Space Leaping Using Ray Coherence" Center for Visual Computing (CVC) nad Department of Computer Science; Stony Brook University; Stony Brook, NY, 2004.

* cited by examiner

*Primary Examiner* — Daniel F Hajnik
*Assistant Examiner* — Jeffrey Chow
(74) *Attorney, Agent, or Firm* — Pearne & Gordon LLP

(57) ABSTRACT

This invention provides an image processing method for projecting a virtual ray onto volume data to create an image and making it possible to realize speeding up without performing preprocessing. A virtual ray 22 is projected from an eye O onto an object 21, a position P at which the remaining light amount of the virtual ray 22 first attenuates is acquired, and a traveling distance d of the virtual ray 22 at the position P is acquired. To project an adjacent virtual ray 23, the virtual ray 23 is projected from a position O2 offset distance Δd smaller than the traveling distance d from the eye O by a predetermined value. Thus, when projection processing is performed, depth information d of the position P at which a first object is acquired on the virtual ray is stored and an adjacent virtual ray is projected from the position O2 offset Δd slightly smaller than the depth d, thereby skipping calculation.

17 Claims, 17 Drawing Sheets

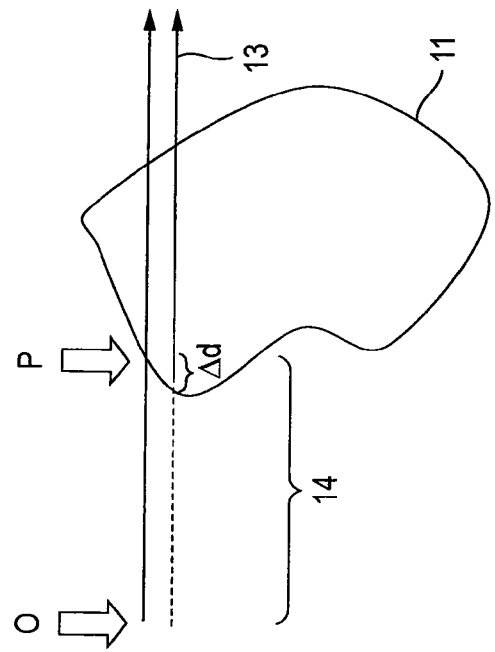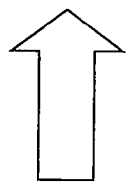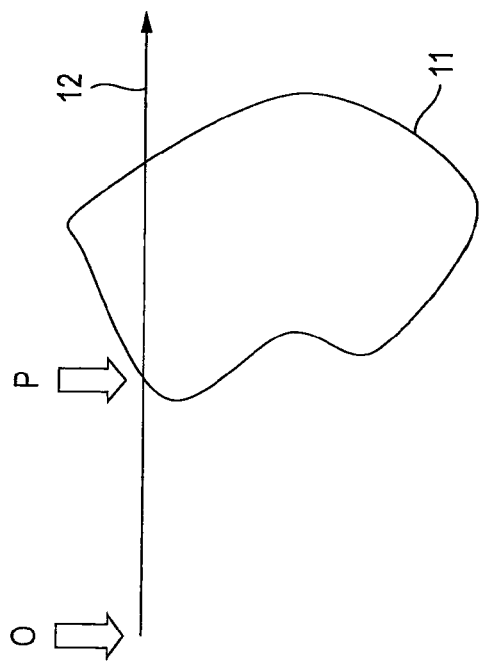
FIG. 1A
FIG. 1B

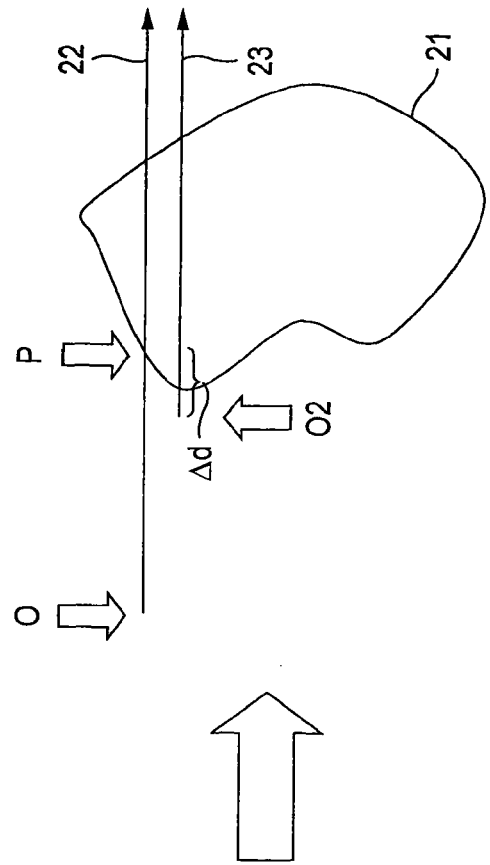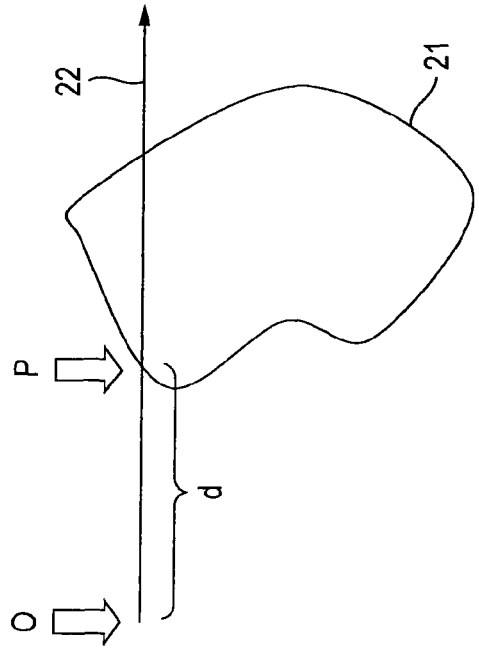

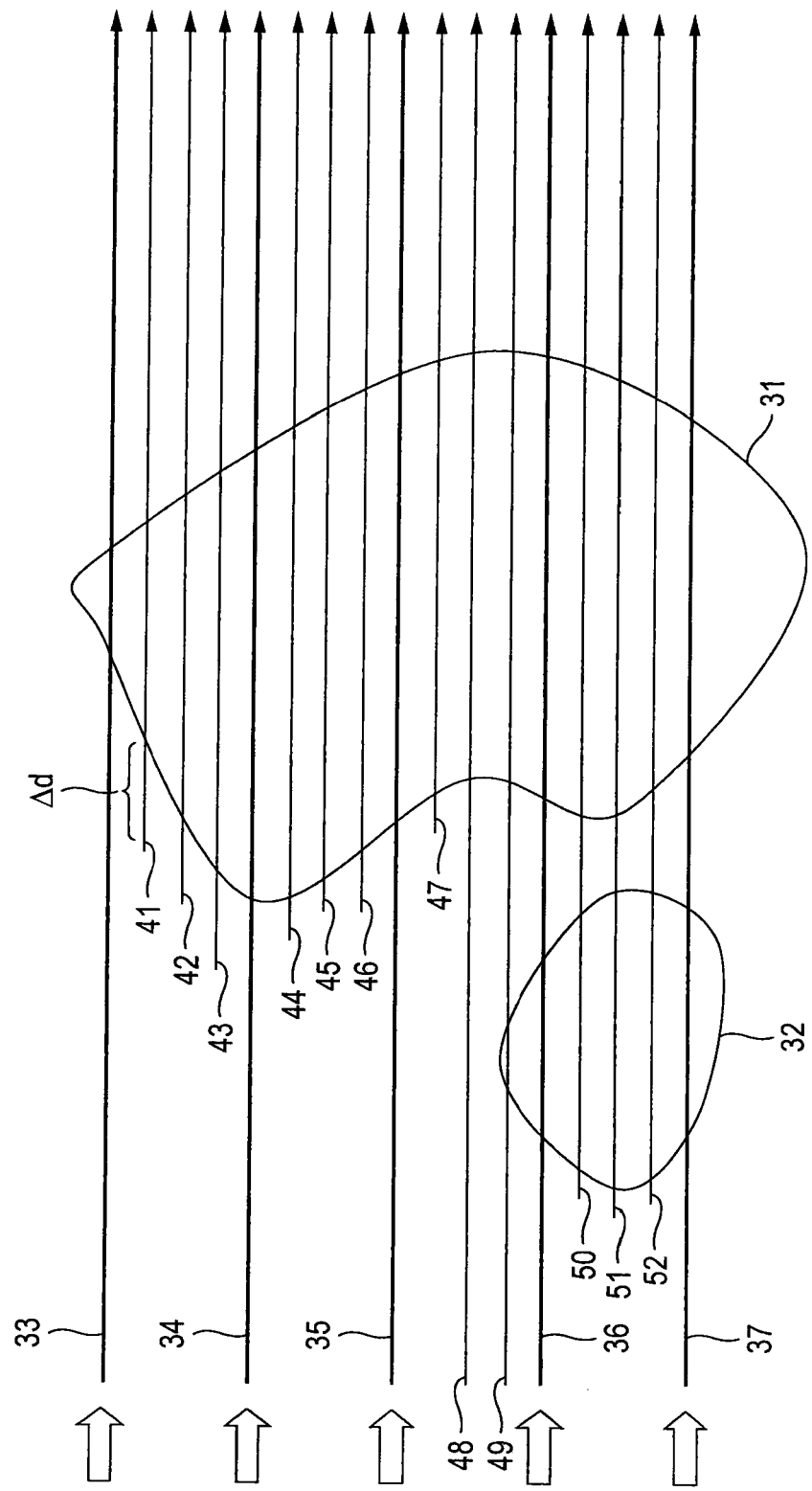

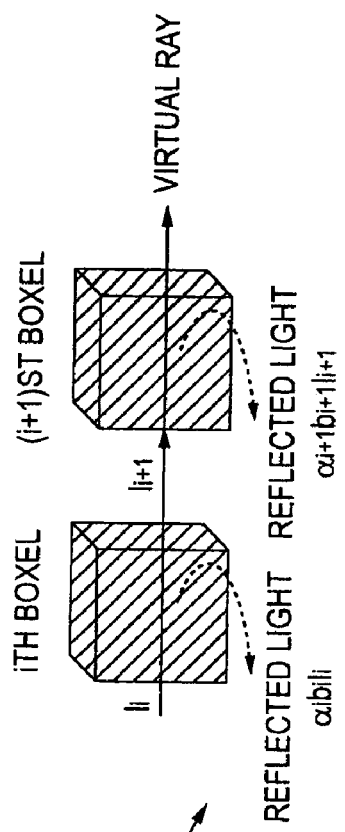
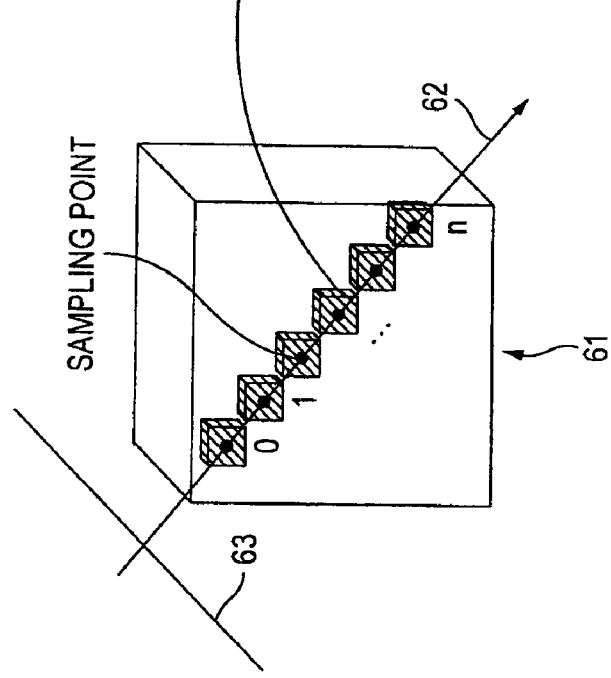
FIG. 13A
FIG. 13B
PRIOR ART

PRIOR ART

PRIOR ART

PRIOR ART

PRIOR ART

IMAGE PROCESSING METHOD

This application is based on and claims priority from Japanese Patent Application No. 2006-262892, filed on Sep. 27, 2006, the entire contents of which are hereby incorporated by reference.

BACKGROUND OF THE INVENTION

1. Technical Field

This invention relates to an image processing method for projecting a virtual ray onto volume data to create an image.

2. Background Art

Hitherto, a three-dimensional image data provided as a volume data by a computed tomography (CT) apparatus, a magnetic resonance imaging (MRI) apparatus, and etc. Volume data has been projected in any desired direction to provide a projection image. Volume rendering is widely used as processing for providing such a projection image. As the volume rendering, for example, Maximum Intensity Projection (MIP) processing for extracting the maximum voxel value on a virtual ray relative to the projection direction to perform projection, Minimum Intensity Projection (MinIP) processing for extracting the minimum voxel value and to perform projection, a ray casting method of projecting a virtual ray in the projection direction and calculating reflected light from the object, and the like are known.

There are projection methods of setting an eye and a projection plane and projecting volume data onto the projection plane as seen from the eye. Parallel projection method and perspective projection method are known as the projection method.

The parallel projection method is a method of forming an eye as a plane (for simulating eye point in infinite distance) and projecting volume data onto a projection plane in parallel from the eye; the method is suited for creating an image of an object such as an organ from volume data as viewed from the outside of the object. On the other hand, the perspective projection method is a method of setting an eye as a point and projecting volume data existing between the eye and a projection plane onto the projection plane radially from the eye as the center position, whereby a virtual endoscope image of an organ is created, for example. In addition, a cylindrical projection method in which eyes are set along a line is used to create medical images.

FIG. 13 are schematic views to explain the ray casting method. In the ray casting method, a virtual ray 62 is projected onto volume data 61 and reflected light and remaining light amount of each voxel (0, 1, . . . , n) on the virtual ray 62 are acquired, as shown in FIG. 13A. That is, the volume data 61 is sampled at a given interval on the virtual ray 62, the amount of light reflected at each sampling point is calculated, the reflected light amount is added, and the remaining light amount is subtracted, whereby the pixel value of a point on a projection plane 63 is acquired.

FIG. 13B shows how to obtain reflected light amount at the ith voxel and the (i+1)st voxel. Assuming the remaining light amount (incidence light) on the ith voxel is "$I_i$," the opacity of the ith voxel is "$α_i$," and a reflection coefficient of the ith voxel is "$β_i$," remaining light amount "$I_{i+1}$" of the (i+1)st voxel and projection value "R" are as follows:

$$I_{i+1}=(1-α_i)I_i \qquad (1)$$

$$R=Σα_iβ_iI_i \qquad (2)$$

FIG. 14 is a flowchart of the ray casting method in a related art. In the ray casting method in the related art, first, projection plane Image [p, q] is set (step S51) and volume data Vol [x, y, z] is acquired (step S52).

Next, a double loop is formed according to projection plane parameter p, q and scanning is executed over the projection plane (step S53). Projection start point O (x, y, z) of an eye corresponding to the parameter p, q and step vector ΔS (x, y, z) are set and current position X (x, y, z) is set to O (x, y, z), remaining light amount I is set to 1, and reflected light F is set to 0 (step S54).

Next, partial reflected light and transmitted light are calculated from volume data Vol (X), and the remaining light amount I and the reflected light F are calculated (step S55). It is determined whether or not remaining light amount I>0 and current position X (x, y, z)≠ray end position (step S56).

If remaining light amount I>0 and current position X (x, y, z)≠ray end position (yes), the current position X is set to X+ΔS (step S57) and the process returns to step S55. On the other hand, if it is determined that remaining light amount I≦0 or current position X (x, y, z)=ray end position (no), the reflected light F is adopted as the pixel value of the projection plane Image [p, q] (step S58) and the process returns to step S53.

FIGS. 15A and 15B are schematic views to explain a problem of the ray casting method in related art. In the ray casting method in the related art, as shown in FIG. 15A, a virtual ray 68 is projected onto volume data 65 and reflected light is acquired from all voxels on the virtual ray 68. However, not only opaque voxels corresponding to the region of an object 67, but also a large number of transparent voxels (null voxels) not contributing to the final projection value exist on the virtual ray 68, such as those belonging to a region of air 66 and a region of tissue which is not the target of observation.

FIG. 15B shows a virtual ray passing through a transparent voxel. For example, if the ith voxel is transparent, opacity $α_i$ of the ith voxel is 0 and therefore the remaining light amount "$I_{i+1}$" of the (i+1)st voxel is as follows:

$$I_{i+1}=(1-α_i)I_i=I_i \qquad (3)$$

"$I_{i+1}$" of the (i+1) st voxel is equal to the remaining light amount "$I_i$" of the ith voxel. Thus, whether or not the voxel is sampled, the projection value is not affected. Consequently, techniques of skipping sampling computation of null voxels have been proposed to speed up the ray casting method.

FIGS. 16A and 16B are a schematic view to explain a speeding-up technique of the ray casting method in the related art (refer to non-patent document 1). In the speeding-up technique in the related art, preprocessing is performed for previously marking null voxels and when projection is executed, calculation of null voxel region is omitted. Accordingly, speeding-up is made possible without degrading the rendering accuracy.

In this case, a mask of setting a null voxel region 72 to "0" and setting a non-null voxel region 73 to "1" is created for volume data 71, as shown in FIG. 16A. When projection processing onto volume data 74 is performed, the mask is referenced and only a non-null voxel region 76 is sampled and sampling of null voxels is skipped (the dotted line portion of a virtual ray 75 is not sampled), as shown in FIG. 16B.

As related techniques, a technique of skipping calculation of a voxel with opacity 1 and later voxels on a virtual ray (for example, refer to patent document 1), and a technique of skipping calculation in a subvoxel (for example, refer to non-patent document 1) are known.

[Patent document 1] U.S. Pat. No. 6,654,012 (Early ray termination in a parallel pipelined volume rendering system)

[Non-patent document 1] Light Weight Space Leaping using Ray Coherence Sarang Lakare and Arie Kaufman IEEE Visualization 2004, pp. 19-26, October 2004, Austin, Tex., USA. http://sled.sourceforge.net/pub/papers/LWSpaceLeapingvis2004.pdf FIGS. 17A and 17B are schematic view to explain a problem of the speeding-up technique in the ray casting method in the related art. In the speeding-up technique in the ray casting method in the related art as described above, sampling computation of null voxels is skipped for speeding up and thus preprocessing needs to be performed for previously creating a mask of recording null voxels.

However, when a LUT (lookup table) function for acquiring transparency from the voxel value is changed, preprocessing must be again performed from the beginning. That is, when a voxel region 82 is created in volume data 81 based on a LUT function (function of voxel value and transparency) shown in FIG. 17A and the LUT function is changed as shown in FIG. 17B, a voxel region 83 in the volume data 81 changes.

Although the technique of skipping calculation of a voxel with opacity 1 and later voxels on a virtual ray (for example, refer to patent document 1) is effective, only calculation of a voxel with opacity 1 and the later voxels is skipped and therefore the effect produced by the technique is insufficient. In the technique of skipping calculation in a subvoxel (for example, refer to non-patent document 1), the number of virtual rays that can skip is very limited and thus the effect is insufficient.

It is therefore an object of the invention to provide an image processing method for projecting a virtual ray onto volume data to create an image and making it possible to realize speeding up without performing preprocessing.

SUMMARY OF THE INVENTION

In order to achieve the object, according to a first aspect of the present invention, an image processing method for projecting a virtual ray onto volume data to create an image, said image processing method comprising:

projecting a first virtual ray from a first eye;

acquiring an attenuation position at which a remaining light amount of the first virtual ray attenuates by a predetermined amount; and acquiring a traveling distance of the first virtual ray from the first eye to the attenuation position, wherein to project a second virtual ray adjacent to the first virtual ray, a projection start position of the second virtual ray is a position offset by a predetermined value in a direction of travel towards a second eye from a traveling position, the traveling position being at the traveling distance from the second eye.

According to the image processing method of the present invention, calculation corresponding to the traveling distance from the eye to the attenuation position at which the remaining light amount of the first virtual ray attenuates by the predetermined amount can be skipped, so that it is made possible to speed up the image processing without performing preprocessing. By offsetting by the predetermined value to the eye side, a large number of virtual rays can be omitted exceeding the subvoxel range.

According to a second aspect of the present invention as set forth in the first aspect of the present invention, it is preferable that when a voxel is not transparent at the projection start position of the second virtual ray, the second virtual ray is projected from a position further offset by a predetermined value in the direction of travel towards the second eye.

According to the image processing method of the invention, if an abnormal state is detected on the virtual ray, for example, as the voxel is not transparent at the position offset by the predetermined value to the eye side, a virtual ray is projected from a position further short, so that the whole of the object to be observed is rendered and the calculation amount can be reduced for performing processing at high speed.

According to a third aspect of the present invention as set forth in the first aspect of the present invention, it is preferable that the first virtual ray is projected every predetermined interval.

According to a fourth aspect of the present invention as set forth in the first aspect of the present invention, it is preferable that the image processing method further comprises:

projecting a third virtual ray from a third eye;

acquiring an attenuation position at which a remaining light amount of the third virtual ray attenuates by a predetermined amount;

acquiring a traveling distance of the third virtual ray from the third eye to the attenuation position of the third virtual ray; and further using the traveling distance of the third virtual ray to calculate the predetermined value for offsetting the projection start position of the second virtual ray in the direction of travel towards the second eye.

According to a fifth aspect of the present invention as set forth in the fourth aspect of the present invention, it is preferable that a comparison is made between the traveling distances of the first and third virtual rays, and when the difference between the traveling distances is equal to or greater than a predetermined value, the second virtual ray is projected from the second eye.

According to the image processing method of the invention, a virtual ray is projected without skipping calculation every given interval and calculation for the virtual ray within the given interval is skipped, so that an object existing at a distance from the first rendered object can be detected and all target objects can be rendered precisely and at high speed.

According to a sixth aspect of the present invention as set forth in the first aspect of the present invention, it is preferable that the image processing method of the invention is an image processing method for creating a virtual endoscope image.

According to a seventh aspect of the present invention as set forth in the first aspect of the present invention, it is preferable that the image processing method of the invention is an image processing method for creating an image by performing parallel processing.

According to an eighth aspect of the present invention as set forth in the first aspect of the present invention, it is preferable that an image processing program of the invention is an image processing program for projecting a virtual ray onto volume data to create an image, the program for permitting a computer to execute the image processing method of the invention.

According to the invention, the calculation corresponding to the traveling distance from the eye to the attenuation position at which the remaining light amount of the first virtual ray attenuates by the predetermined amount can be skipped, so that it is made possible to speed up the image processing without performing preprocessing.

BRIEF DESCRIPTION OF THE DRAWINGS

In the accompanying drawings:

FIGS. 1A and 1B are schematic views to explain the basic concept of an image processing method according to the invention;

FIGS. 3A and 3B are schematic views to explain example 1 in the image processing method of the invention;

FIG. 5 is a schematic view to explain example 3 in the image processing method of the invention;

FIGS. 13A and 13B are schematic views to explain a ray casting method;

DETAILED DESCRIPTION OF EXEMPLARY EMBODIMENTS

FIGS. 1A and 1B are schematic views to explain the basic concept of an image processing method of the invention. The image processing method of the invention can be applied to a ray casting method using volume data. A virtual ray 12 is projected onto an object 11 from an eye O shown in FIG. 1A and a position P at which the remaining light amount of the virtual ray 12 first attenuates is acquired and the traveling distance (O-P) of the virtual ray 12 at the position P is acquired.

To project an adjacent virtual ray 13, the virtual ray 13 is projected from a position nearer to the eye than the position P by a predetermined distance $\Delta d$, in which $\Delta d$ is smaller than the traveling distance (O-P), as shown in FIG. 1B. Accordingly, processing to the first opaque (including translucent) voxel can be skipped, whereby speeding up of the ray casting method is achieved without performing preprocessing.

Thus, in the image processing method of the invention, the projection start position of a virtual ray is determined dynamically and computation concerning null voxels can be skipped. The method is particularly effective for creating a virtual endoscope image which is difficult to render with the above described prior techniques requiring preprocessing.

Figure 2:
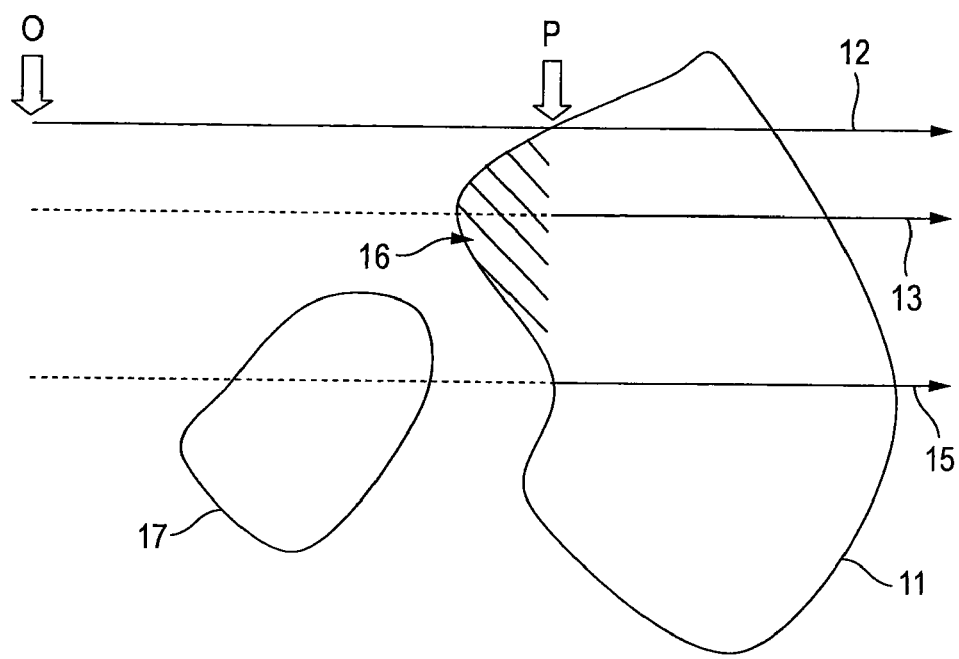
FIG. 2 is a schematic view to explain matters to pay attention in executing the image processing method of the invention.

FIG. 2 is a schematic view to explain matters to pay attention in executing the image processing method of the invention. Although the image processing method of the invention can change the projection start position of a virtual ray dynamically and can skip computation concerning null voxels, there is a possibility that an unrendered object may occur if calculation is skipped carelessly.

That is, as shown in FIG. 2, a virtual ray 12 is projected onto an object 11 from an eye O and a position P at which the remaining light amount of the virtual ray 12 first attenuates is acquired and the traveling distance (O-P) of the virtual ray 12 to the position P is acquired. However, if an adjacent virtual ray 13 is projected from the point corresponding to the position P ($\Delta d=0$), a portion 16 occurs in the object 11 is not rendered. With a virtual ray 15 projected from the point corresponding to the position P, object 17 is completely unrendered.

Accordingly, in the image processing method according to an embodiment of the invention, using the fact that an adjacent virtual ray crosses an object almost at the same position, a virtual ray is projected a predetermined distance short of the position at which the adjacent virtual ray first crosses the object (corresponding to example 1). To safely render an object surface, an abnormal state is detected on a virtual ray for performing calculation (corresponding to example 2). Further, to detect an unrendered object, a virtual ray is projected without skipping calculation every given interval (corresponding to example 3).

EXAMPLE 1

FIGS. 3A and 3B are schematic views to explain example 1 in the image processing method of the invention. In the embodiment (example 1), a virtual ray is projected from a predetermined distance short of the position at which the adjacent virtual ray first crosses the object.

That is, a virtual ray 22 is projected onto an object 21 from an eye O shown in FIG. 3A and a position P at which the remaining light amount of the virtual ray 22 first attenuates is acquired and traveling distance d of the virtual ray 22 from the eye to the position P is acquired. To project an adjacent virtual ray 23, the virtual ray 23 is projected from a position O2 which is nearer to the eye than the position P by a predetermined distance $\Delta d$, in which $\Delta d$ is smaller than the traveling distance d, as shown in FIG. 3B. As the distance $\Delta d$, a distance corresponding to a predetermined number of voxels may be used.

Thus, in the embodiment (example 1), when projection processing is performed, depth information d of the position P at which a first object is crossed on the virtual ray is stored. Then, an adjacent virtual ray is projected from the position O2, the depth of which is offset $\Delta d$ smaller than the depth d, thereby skipping calculation. Accordingly, if the surface shape of the object to be observed is bumpy, it can be handled.

EXAMPLE 2

Figure 4B:
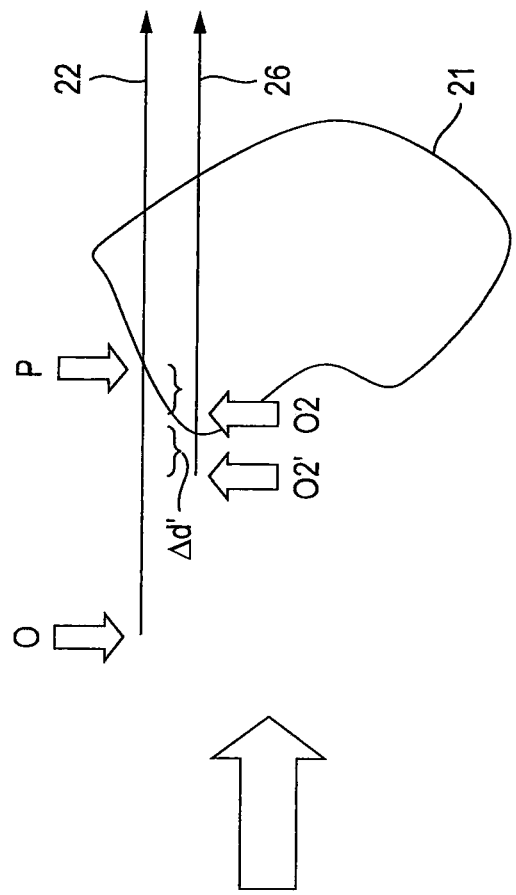
FIGS. 4A and 4B are schematic views to explain example 2 in the image processing method of the invention.
Figure 4A:
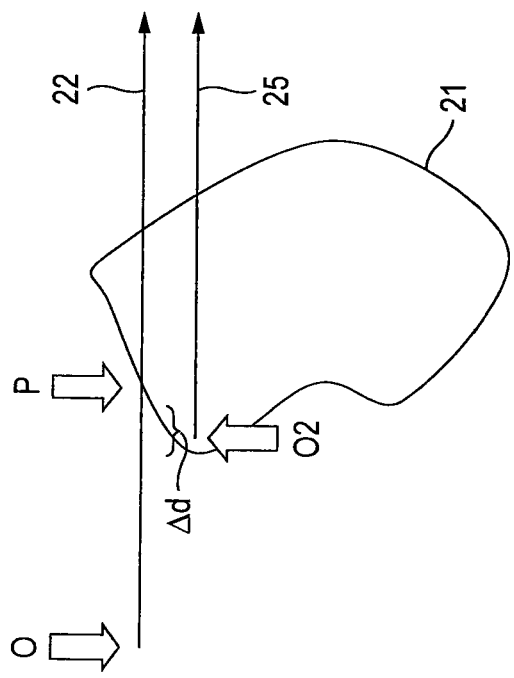

FIG. 4 are schematic views to explain example 2 in the image processing method of the invention. In the embodiment (example 2), an abnormal state is detected on a virtual ray for performing calculation. That is, as shown in FIG. 4A, a virtual ray 22 is projected onto an object 21 from an eye O and a position P at which the remaining light amount of the virtual ray 22 first attenuates is acquired. To project a virtual ray 25 adjacent to the virtual ray 22, the virtual ray 25 is projected from a position O2 which is nearer to the eye than the position P by a distance Δd. In the example, it is detected that the opacity of the voxel at the position O2 is not 0.

In this case, the fact that the opacity of the voxel at the position O2 is not 0 means that projection of the virtual ray 25 is started from within the object 21. This means that the region that should be rendered exists in front of the position O2.

Therefore, in the example, as shown in FIG. 4B, if it is detected that the opacity of the voxel at the position O2 is not 0 on the virtual ray, the virtual ray 26 is projected from a position O2' further in front of the position O2 by a distance Δd'. Accordingly, the whole of the object 21 is rendered and the calculation amount can be reduced thereby performing ray casting processing at high speed. Further, if the opacity of the voxel at the position O2' is not 0 either, a virtual ray is projected from a position further in front. For simplicity, if the opacity of the voxel at the position O2 is not 0, a virtual ray may be projected from the position corresponding to the position O without any skipping. Further, in the subsequent processing, previously acquired Δd' may be used as the amount of Δd, so that the efficiency furthermore improves.

EXAMPLE 3

FIG. 5 is a schematic view to explain example 3 in the image processing method of the invention. In the embodiment (example 3), new projection start position of each virtual ray (e.g., virtual rays 41 to 43, 44 to 46, 47, and 50 to 52) is determined by using previous results of projecting a plurality of virtual rays (e.g., virtual rays 33, 34, 35, 36, and 37) from the eyes every given interval without skipping calculation. That is, the virtual rays 33, 34, 35, 36, and 37 at given intervals are projected from the eye. The virtual rays 41 to 43, 44 to 46, 47, and 50 to 52 between the virtual rays (33 to 37) are projected Δd short of object 31, 32, thereby skipping calculation. Virtual rays 48 and 49 are projected from the eye. In so doing, the object 32 at a distance from the first rendered object 31 can also be rendered and all objects to be observed can be rendered.

Figure 6:
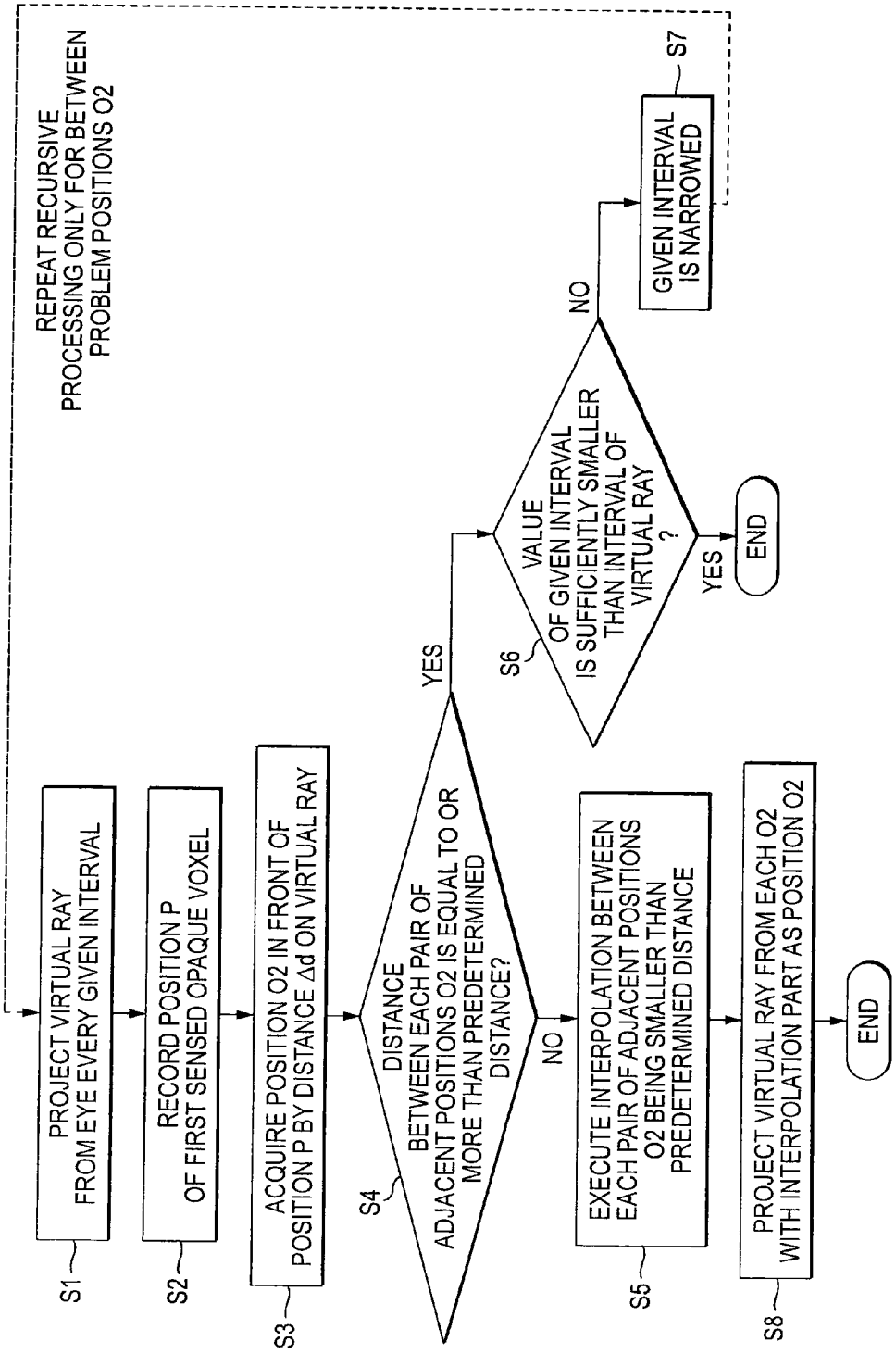
FIG. 6 is a processing flowchart of example 3 in the image processing method of the invention.

FIG. 6 is a processing flowchart of example 3 and FIGS. 7, 8, 9, and 10 are schematic views to explain the details of example 3. The processing will be discussed in detail with reference to FIGS. 6 to 10.

Figure 7:
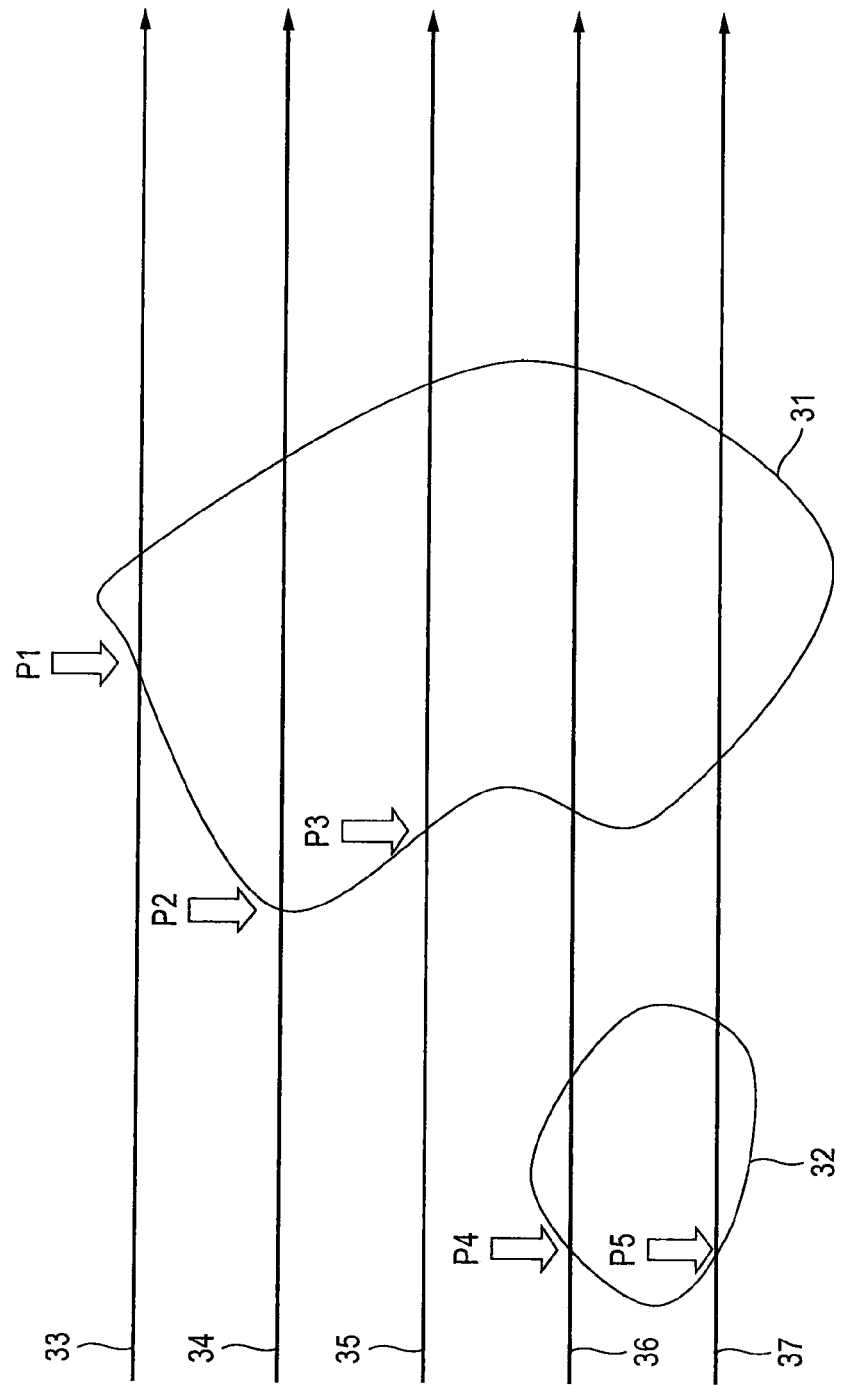
FIG. 7 is a schematic view (1) to explain the details of example 3 in the image processing method of the invention.

In the image processing method of the example, first, virtual rays 33, 34, 35, 36, and 37 are projected from the eye every given interval as shown in FIG. 7 (step S1). At this time, the interval is determined from the size of the object 31, 32 estimated to be the observation target so as not to miss the object 31, 32. Positions P1, P2, P3, P4, and P5 of first opaque voxels on the virtual rays 33, 34, 35, 36, and 37 are recorded (step S2). The interval may be any smaller number than the diameter of the minimum object to be observed.

Figure 8:
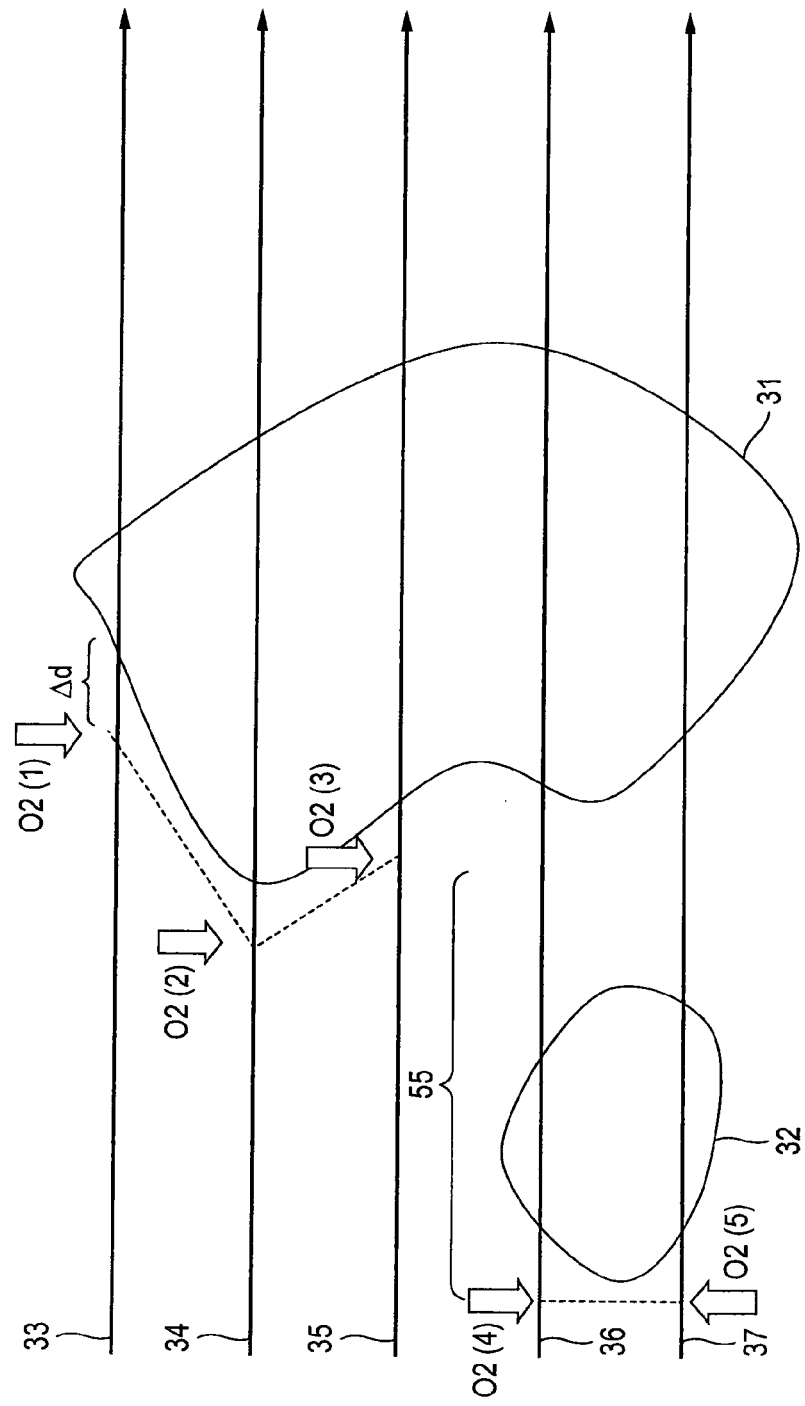
FIG. 8 is a schematic view (2) to explain the details of example 3 in the image processing method of the invention.

Next, positions O2 (1), O2 (2), O2 (3), O2 (4), and O2 (5) in front of the positions P1, P2, P3, P4, and P5 by a distance Δd on the virtual rays 33, 34, 35, 36, and 37 are acquired as shown in FIG. 8 (step S3). In this case, whether or not distance between each pair of adjacent positions O2 (distance between the position O2 (3) and the position O2 (4) in depth direction (arrow 55)) is smaller than a predetermined distance is determined (step S4). If the distance between two positions O2 are smaller than or equal to the given distance, interpolation is executed between the positions O2 as indicated by a dotted line (step S5). On the other hand, if the distance is larger than the given distance, judging that the objects 31 and 32 are long distance apart as indicated by the arrow 55, interpolation is not executed. In such a case, the given interval projecting a virtual ray from the eye without skipping calculation is narrowed and recursive processing is performed for the part where no interpolation is performed (between the virtual rays 35 and 36) (step S7), whereby the accuracy of rendering is enhanced.

Figure 9:
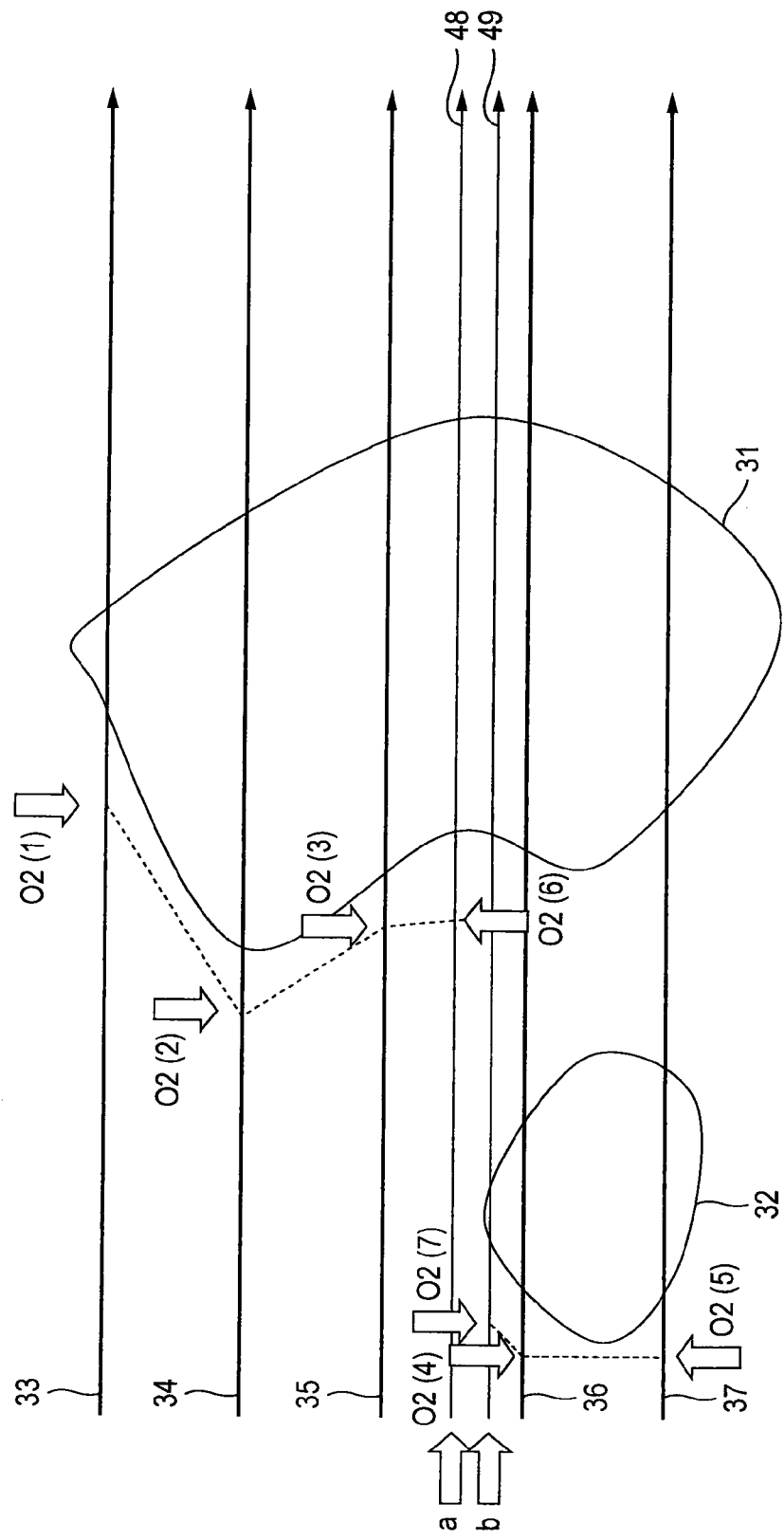
FIG. 9 is a schematic view (3) to explain the details of example 3 in the image processing method of the invention.

Next, the recursive processing will be discussed as shown in FIG. 9. Again, virtual ray 48 (arrow a) is projected onto the part where no interpolation is performed (between the virtual rays 35 and 36) from the eye, and position O (6) which is in front of the corresponding object surface by a distance Δd toward the eye side is acquired (recursive step S1). Accordingly, improper skipping of ray calculation can be avoided. Thus, steps S1 to S5 described above are repeated for the newly added virtual ray 48 (arrow a). At this time, whether or not distance between each pair of adjacent positions O2 (position O2 (7) and position O2 (4)) is larger than the given distance is determined for the newly added virtual ray (recursive step S4). If such pair exists, it is determined that the objects 31 and 32 are at too long a distance from each other as at the previous step, and interpolation is not executed. In such a case, the given interval projecting a virtual ray from the eye is further lessened and recursive processing is further executed. If the given interval projecting a virtual ray from the eye is smaller than the interval of virtual rays after the final interpolation, it is fruitless to further narrow the given interval and therefore the recursive calculation is terminated (YES at step S6); otherwise (NO at step S6), the given interval projecting a virtual ray from the eye is further lessened and recursive processing is performed for the part where no interpolation is performed (between the virtual rays 48 an 36) (recursive step S7). Position O2 (7) and a virtual ray 49 (arrow b) are determined by repeating recursive processing.

Figure 10:
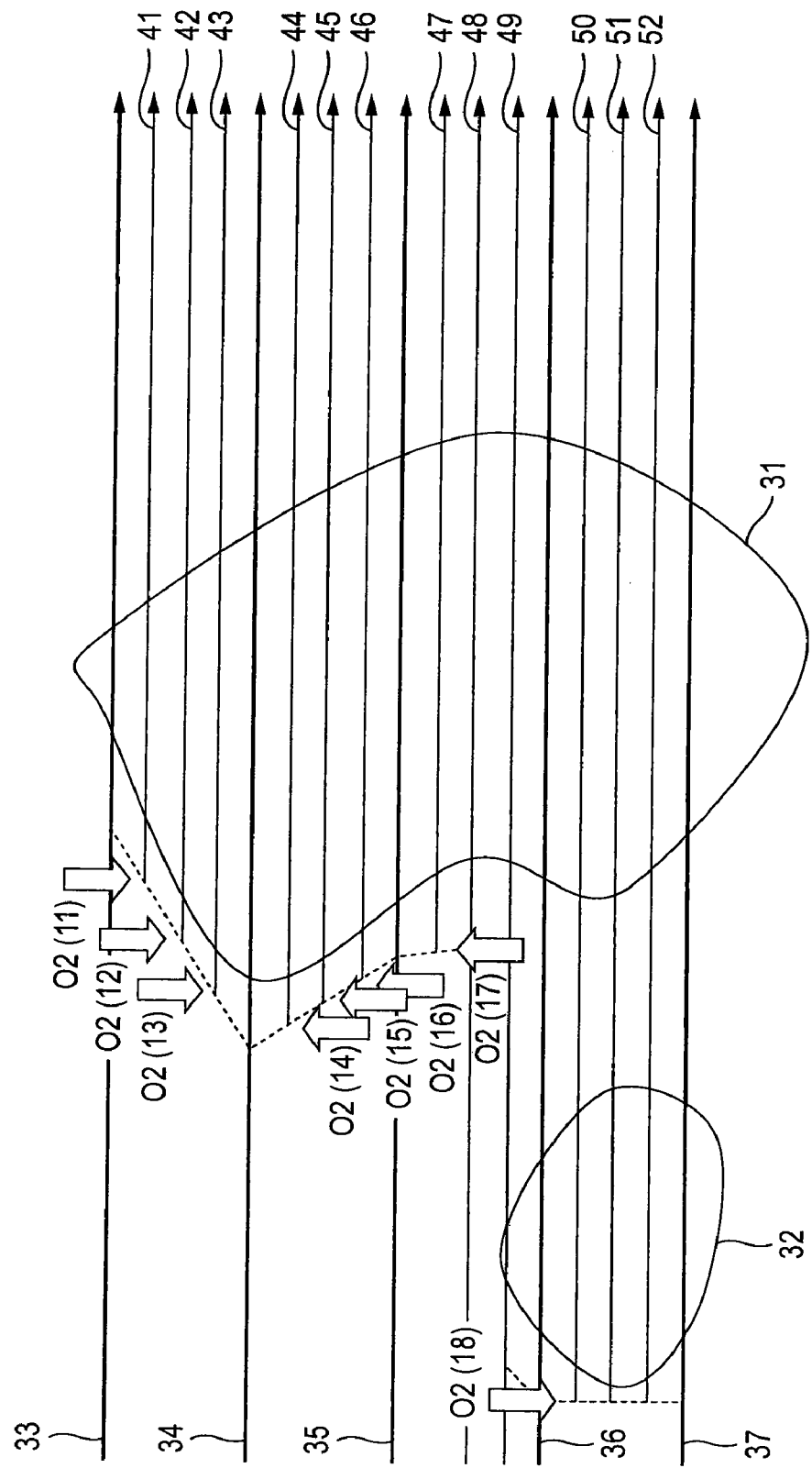
FIG. 10 is a schematic view (4) to explain the details of example 3 in the image processing method of the invention.

Next, virtual rays 41 to 52 are projected from each O2 with the interpolation parts as positions O2 (11) to O2 (18) as shown in FIG. 10 (step S8). Thus, according to the example, a virtual ray is projected without skipping calculation every given interval and calculation for the virtual ray within the given interval is skipped, so that an object existing at a distance from the first rendered object can be detected and all target objects can be rendered at high speed.

Figure 11:
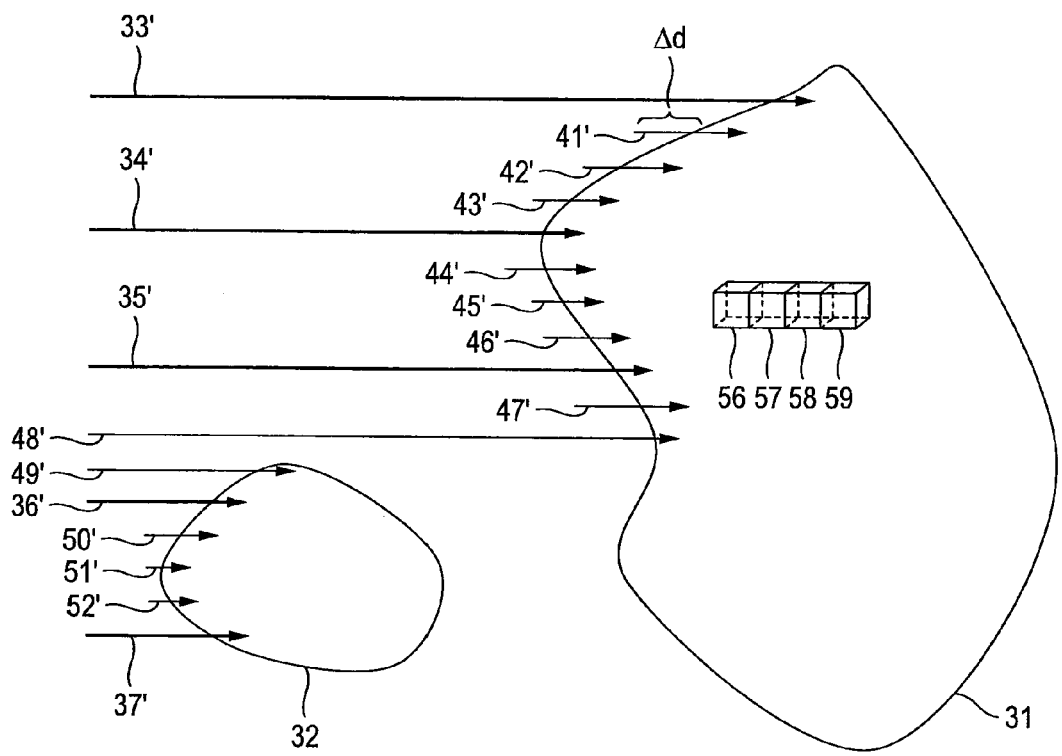
FIG. 11 is a schematic view to explain calculation termination position in the image processing method of an embodiment of the invention.

FIG. 11 is a schematic view to explain calculation termination positions in the image processing method of the embodiment. In the examples described above, for convenience, representation is made so that each virtual ray arrives at the ray end position. However, since calculation is terminated when the remaining light amount of the virtual ray becomes 0, the actual calculation range is as follows:

The calculation range of each of virtual rays 33' to 37' 48', and 49' is from the eye to the position where the remaining light amount of the virtual ray becomes 0 in the object 31, 32, and the calculation range of each of virtual rays 41' to 47' and 50' to 52' is from Δd short of the surface of the object 31, 32 to the position where the remaining light amount becomes 0 in the object 31, 32. The distance Δd, which is the distance in the virtual ray projection direction between the attenuation position at which the remaining light amount of the virtual ray projected from the eye attenuates a predetermined amount and the projection start position of an adjacent virtual ray predicted based on the traveling distance from the eye to the attenuation position, is larger than the size of voxels 56 to 59, etc. Although two points within a voxel may have different data value due voxel value interpolation, with commonly used linear interpolation and spline interpolation, it cannot happen that the opacity of one of the two points is zero and that of other is not zero.

Figure 12:
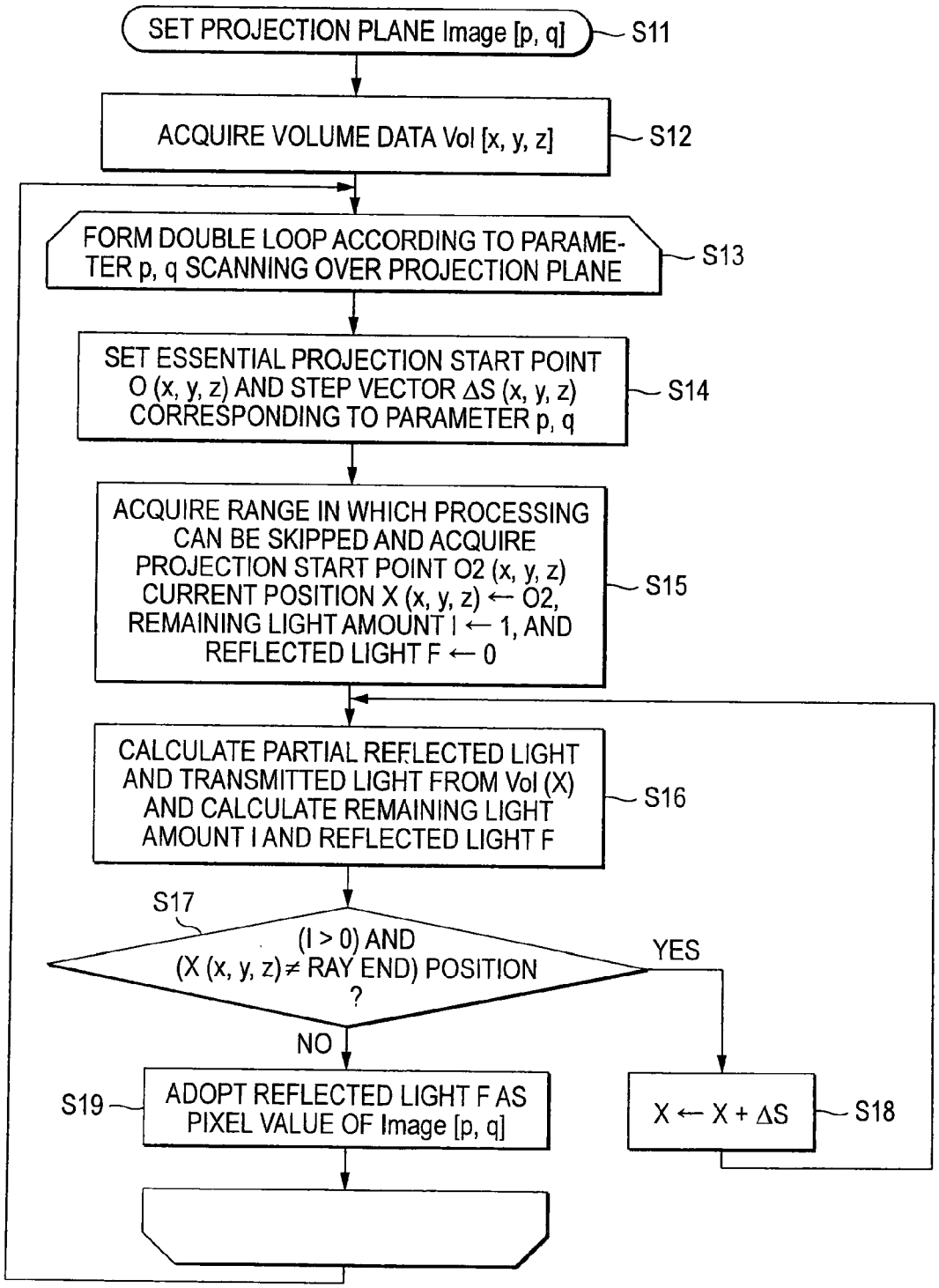
FIG. 12 is a flowchart of a ray casting method of the embodiment.
Figure 14:
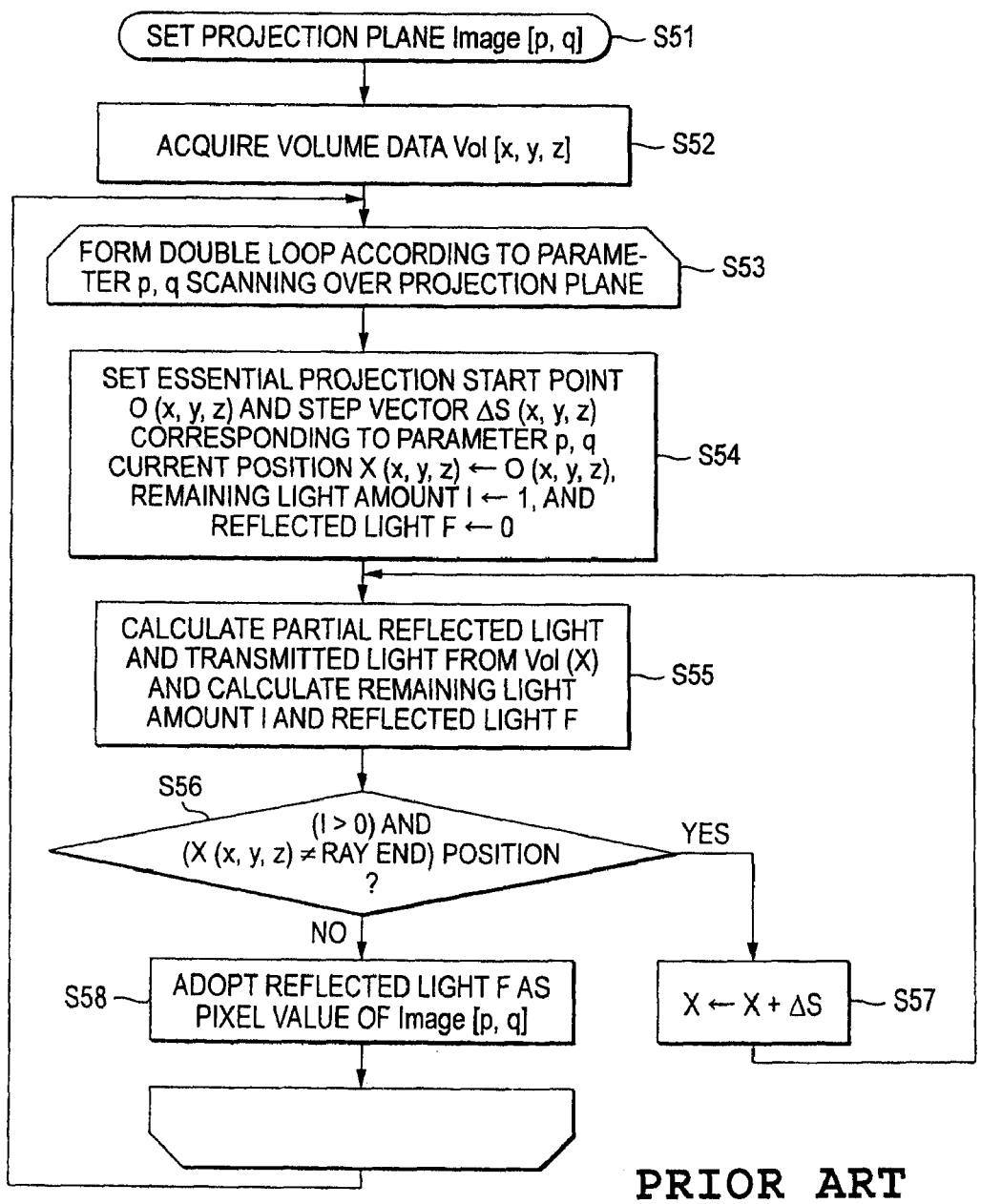
FIG. 14 is a flowchart of a ray casting method in related art.
Figure 15A:
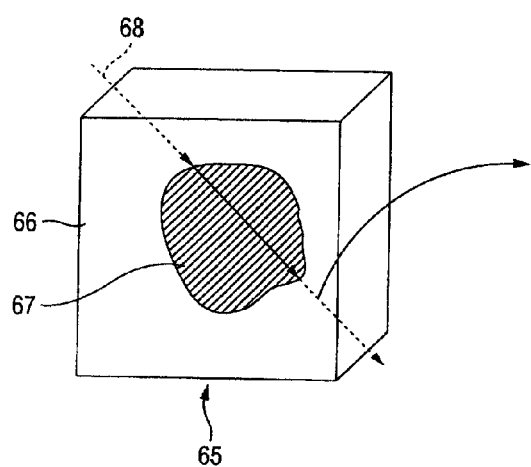
FIGS. 15A and 15B are schematic views to explain a problem of the ray casting method in related art.
Figure 15B:
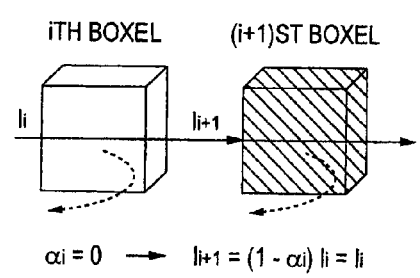
Figure 16A:
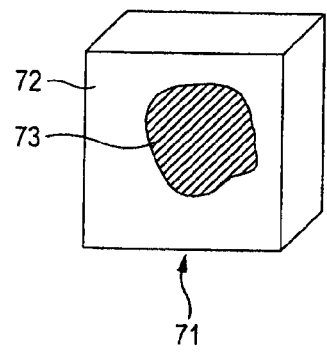
FIGS. 16A and 16B are schematic views to explain a speeding-up technique in the ray casting method in related art.
Figure 16B:
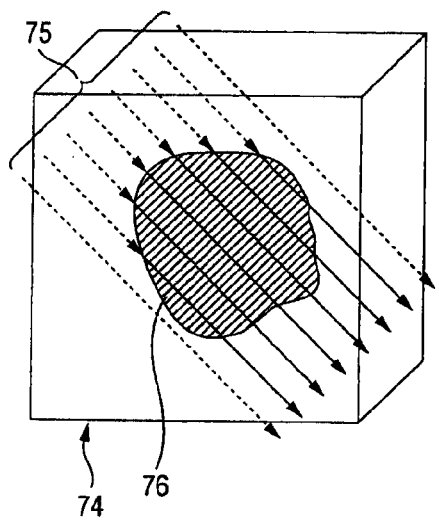
Figure 17A:
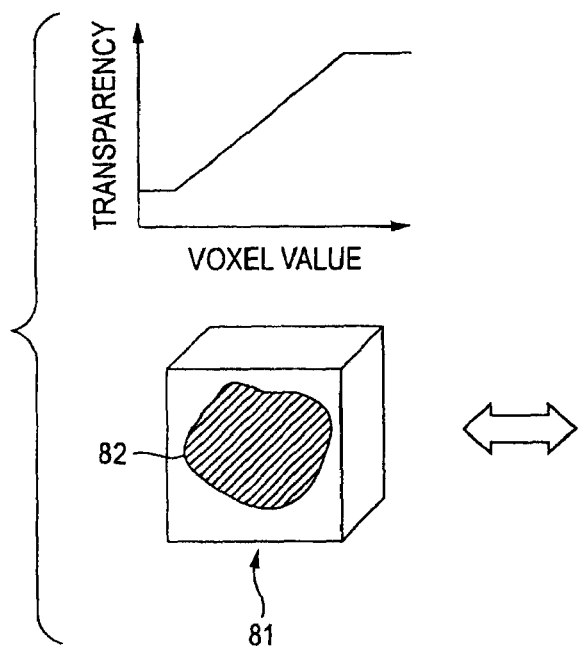
FIGS. 17A and 17B are schematic views to explain a problem of the speeding-up technique in the ray casting method in related art.
Figure 17B:
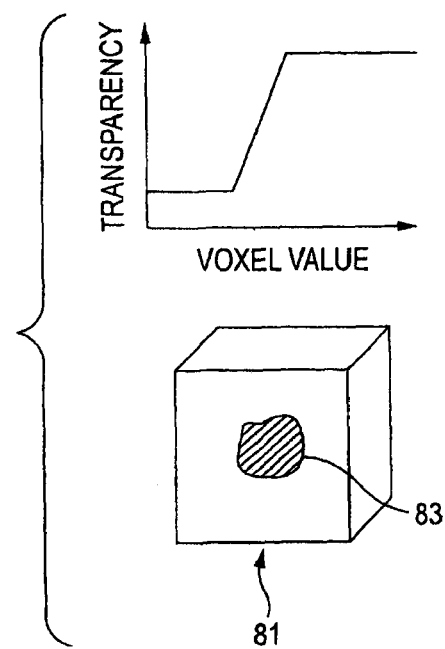

FIG. 12 is a flowchart to project a virtual ray whose traveling distance is predicted in the ray casting method of the embodiment. In the embodiment, first, projection plane Image [p, q] is set (step S11) and volume data Vol [x, y, z] is acquired (step S12).

Next, a double loop is formed according to projection plane parameter p, q and scanning is executed over the projection plane (step S13). Essential projection start point (corresponding to the eye) O (x, y, z) corresponding to the parameter p, q and step vector ΔS (x, y, z) are set (step S14).

Next, the range in which processing can be skipped is acquired (FIG. 6) and projection start point (projection start position predicted based on the traveling distance of the virtual ray from the eye to the attenuation position) O2 (x, y, z) is acquired. That is, current position X (x, y, z) is set to position O2, remaining light amount I is set to 1, and reflected light F is set to 0 (step S15). Partial reflected light and transmitted light are calculated from volume data Vol (X) and the remaining light amount I and the reflected light F are calculated (step S16).

Next, whether or not remaining light amount I>0 and current position X (x, y, z)≠ ray end position are determined (step S17). If remaining light amount I>0 and current position X (x, y, z)≠ ray end position (yes), the current position X is set to X+ΔS (step S18) and the process returns to step S16. On the other hand, if it is not determined that remaining light amount I>0 and current position X (x, y, z)≠ ray end position (no), the reflected light F is adopted as the pixel value of the projection plane Image [p, q] (step S19) and the process returns to step S13.

Thus, in the image processing method of the embodiment, a first virtual ray is projected from the eye, the attenuation position (the position of the first opaque (containing translucent) voxel) at which the remaining light amount of the first virtual ray attenuates by a predetermined amount is acquired, the traveling distance of the first virtual ray from the eye to the attenuation position is acquired, and it is predicted that the projection start position of a second virtual ray adjacent to the first virtual ray is the position offset by a predetermined value in a direction of travel towards the eye from the traveling distance of the first virtual ray based on the traveling distance of the first virtual ray. According to the method, the second virtual ray is projected from the predicted projection start position, whereby calculation corresponding to the traveling distance from the eye to the attenuation position at which the remaining light amount of the first virtual ray attenuates by a predetermined amount can be skipped, so that it is made possible to speed up the image processing without performing preprocessing.

In the image processing method of the embodiment, volume rendering calculation can be divided in predetermined angle units, image regions, volume regions, etc., and can be later combined, so that the volume rendering calculation can be performed by parallel processing, network distributed processing, a dedicated processor, or using them in combination.

The invention can be used as the image processing method for making it possible to skip processing to the first opaque voxel without performing preprocessing to speed up the image processing.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. An image processing method implemented by a processor for projecting a virtual ray onto volume data to create an image, said image processing method comprising:
projecting a first virtual ray from a first eye with the processor;
acquiring an attenuation position at which a remaining light amount of the first virtual ray attenuates by a predetermined amount; and
acquiring a traveling distance of the first virtual ray from the first eye to the attenuation position, wherein
to project a second virtual ray with the processor adjacent to the first virtual ray, a projection start position of the second virtual ray is a position offset by a predetermined value in a direction of travel towards a second eye from a traveling position, the traveling position being at the traveling distance from the second eye, wherein the projection start position of the second virtual ray and the second eye are at differing positions, and
when a voxel is not transparent at the projection start position of the second virtual ray, the second virtual ray is projected from a position further offset by a predetermined value in the direction of travel towards the second eye.

2. The image processing method as claimed in claim 1 wherein the first virtual ray is projected every predetermined interval.

3. The image processing method as claimed in claim 1 wherein a virtual endoscope image is created.

4. The image processing method as claimed in claim 1 wherein the image is created by performing parallel processing.

5. The image processing method as claimed in claim 1 further comprising:
projecting a third virtual ray from a third eye;
acquiring an attenuation position at which a remaining light amount of the third virtual ray attenuates by a predetermined amount;
acquiring a traveling distance of the third virtual ray from the third eye to the attenuation position of the third virtual ray; and
further using the traveling distance of the third virtual ray to calculate the predetermined value for offsetting the projection start position of the second virtual ray in the direction of travel towards the second eye.

6. An image processing method implemented by a processor for projecting a virtual ray onto volume data to create an image, said image processing method comprising:
projecting a first virtual ray from a first eye with the processor;
acquiring an attenuation position at which a remaining light amount of the first virtual ray attenuates by a predetermined amount;
acquiring a traveling distance of the first virtual ray from the first eye to the attenuation position, wherein
to project a second virtual ray with the processor adjacent to the first virtual ray, a projection start position of the second virtual ray is a position offset by a predetermined value in a direction of travel towards a second eye from a traveling position, the traveling position being at the traveling distance from the second eye, wherein the projection start position of the second virtual ray and the second eye are at differing positions; and
projecting a third virtual ray from a third eye;
acquiring an attenuation position at which a remaining light amount of the third virtual ray attenuates by a predetermined amount;

acquiring a traveling distance of the third virtual ray from the third eye to the attenuation position of the third virtual ray; and further using the traveling distance of the third virtual ray to calculate the predetermined value for offsetting the projection start position of the second virtual ray in the direction of travel towards the second eye, wherein a comparison is made between the traveling distances of the first and third virtual rays, and when the difference between the traveling distances is equal to or greater than a predetermined value, the second virtual ray is projected from the second eye.

7. The image processing method as claimed in claim 6 wherein the first virtual ray is projected every predetermined interval.

8. The image processing method as claimed in claim 6 wherein a virtual endoscope image is created.

9. The image processing method as claimed in claim 6 wherein the image is created by performing parallel processing.

10. A non-transitory computer-readable medium having computer-executable instructions stored thereon, wherein the computer-executable instructions in response to execution by a computing device cause the computing device to perform an image processing method for projecting a virtual ray onto volume data to create an image, comprising:

projecting a first virtual ray from a first eye;

acquiring an attenuation position at which a remaining light amount of the first virtual ray attenuates by a predetermined amount; and acquiring a traveling distance of the first virtual ray from the first eye to the attenuation position, wherein to project a second virtual ray adjacent to the first virtual ray, a projection start position of the second virtual ray is a position offset by a predetermined value in a direction of travel towards a second eye from a traveling position, the traveling position being at the traveling distance from the second eye, wherein the projection start position of the second virtual ray and the second eye are at differing positions, and wherein when a voxel is not transparent at the projection start position of the second virtual ray, the second virtual ray is projected from a position further offset by a predetermined value in the direction of travel towards the second eye.

11. The image processing method as claimed in claim 10 wherein the first virtual ray is projected every predetermined interval.

12. The image processing method as claimed in claim 10 wherein a virtual endoscope image is created.

13. The image processing method as claimed in claim 10 wherein the image is created by performing parallel processing.

14. A non-transitory computer-readable medium having computer-executable instructions stored thereon, wherein the computer-executable instructions in response to execution by a computing device cause the computing device to perform an image processing method for projecting a virtual ray onto volume data to create an image, comprising:

projecting a first virtual ray from a first eye;

acquiring an attenuation position at which a remaining light amount of the first virtual ray attenuates by a predetermined amount;

acquiring a traveling distance of the first virtual ray from the first eye to the attenuation position, wherein to project a second virtual ray adjacent to the first virtual ray, a projection start position of the second virtual ray is a position offset by a predetermined value in a direction of travel towards a second eye from a traveling position, the traveling position being at the traveling distance from the second eye, wherein the projection start position of the second virtual ray and the second eye are at differing positions; and projecting a third virtual ray from a third eye;

acquiring an attenuation position at which a remaining light amount of the third virtual ray attenuates by a predetermined amount;

acquiring a traveling distance of the third virtual ray from the third eye to the attenuation position of the third virtual ray; and further using the traveling distance of the third virtual ray to calculate the predetermined value for offsetting the projection start position of the second virtual ray in the direction of travel towards the second eye, wherein a comparison is made between the traveling distances of the first and third virtual rays, and when the difference between the traveling distances is equal to or greater than a predetermined value, the second virtual ray is projected from the second eye.

15. The image processing method as claimed in claim 14 wherein the first virtual ray is projected every predetermined interval.

16. The image processing method as claimed in claim 14 wherein a virtual endoscope image is created.

17. The image processing method as claimed in claim 14 wherein the image is created by performing parallel processing.

* * * * *